US 7,647,988 B2

(12) United States Patent
Roussy

(10) Patent No.: US 7,647,988 B2
(45) Date of Patent: Jan. 19, 2010

(54) METHOD AND SYSTEM FOR INSTALLING GEOTHERMAL TRANSFER APPARATUSES WITH A SONIC DRILL

(75) Inventor: Raymond J. Roussy, 12491-57A Avenue, Surrey, British Columbia (CA) V3X 2S6

(73) Assignee: Raymond J. Roussy, Surrey (CA)

( * ) Notice: Subject to any disclaimer, the term of this patent is extended or adjusted under 35 U.S.C. 154(b) by 113 days.

(21) Appl. No.: 11/896,945

(22) Filed: Sep. 6, 2007

(65) Prior Publication Data
US 2009/0065255 A1 Mar. 12, 2009

Related U.S. Application Data

(63) Continuation-in-part of application No. 11/067,225, filed on Feb. 28, 2005.

(51) Int. Cl.
*E21B 7/24* (2006.01)
*E21B 33/13* (2006.01)
*F24J 3/08* (2006.01)

(52) U.S. Cl. ............... 175/56; 175/57; 175/171; 166/286; 165/45

(58) Field of Classification Search ............ 175/55, 175/56, 171, 293, 296, 57; 165/45; 166/286
See application file for complete search history.

(56) References Cited

U.S. PATENT DOCUMENTS

| 1,681,883 | A |   | 8/1928 | Sipe |        |
|-----------|---|---|--------|------|--------|
| 2,123,364 | A |   | 7/1938 | Katterjohn | |
| 2,776,113 | A |   | 1/1957 | Reh  |        |
| 2,893,692 | A | * | 7/1959 | Marx | 175/56 |
| 2,942,849 | A | * | 6/1960 | Bodine | 175/55 |
| 3,023,820 | A |   | 3/1962 | Desvaux, et al. | |
| 3,467,207 | A |   | 9/1969 | Pyles, et al. | |
| 3,604,214 | A |   | 9/1971 | Turzillo | |
| 3,786,874 | A |   | 1/1974 | Jodet, et al. | |
| 3,815,368 | A |   | 6/1974 | Turzillo | |

(Continued)

FOREIGN PATENT DOCUMENTS

GB    2 436 582 A    10/2007

(Continued)

OTHER PUBLICATIONS

"Ground storage of energy in buildings", Arup.com, http://www.arup.com/geotechnics/feature.cfm?pageid=662.

(Continued)

*Primary Examiner*—Giovanna C Wright
(74) *Attorney, Agent, or Firm*—Berenato & White, LLC

(57) ABSTRACT

The present invention relates to a method for drilling a hole and installing a geothermal transfer apparatus. A sonic drilling apparatus is positioned at a desired location. The sonic drilling apparatus includes a rotating and vibrating apparatus for rotating and vibrating a hollow drill string into the ground, the hollow drill string having an inner space. The hole is drilled to a desired depth by rotating and vibrating the hollow drill string into the ground while discharging fluid into the inner space of the hollow drill string. A geothermal transfer apparatus is lowered into the inner space of the hollow drill string following the drilling of the hole to the desired depth. The drill string is then removed from the ground.

18 Claims, 12 Drawing Sheets

U.S. PATENT DOCUMENTS

| | | | |
|---|---|---|---|
| 3,866,693 | A | 2/1975 | Century |
| 3,886,754 | A | 6/1975 | Turzillo |
| 3,962,879 | A | 6/1976 | Turzillo |
| 4,286,651 | A | 9/1981 | Steiger et al. |
| 4,645,017 | A | 2/1987 | Bodine |
| 4,705,118 | A | 11/1987 | Ennis |
| 5,027,908 | A | 7/1991 | Roussy |
| 5,409,070 | A | 4/1995 | Roussy |
| 5,417,290 | A | 5/1995 | Barrow |
| 5,533,356 | A | 7/1996 | DeMasters |
| 5,590,715 | A | 1/1997 | Amerman |
| 5,634,515 | A | 6/1997 | Lambert |
| 6,000,459 | A * | 12/1999 | Jeppesen ................... 165/45 |
| 6,663,321 | B1 | 12/2003 | Bisschops |
| 6,955,219 | B2 * | 10/2005 | Johnson, Jr. ............... 166/286 |
| 7,093,657 | B2 | 8/2006 | Johnson, Jr. |
| 7,270,182 | B2 | 9/2007 | Johnson, Jr. |
| 2003/0221870 | A1 | 12/2003 | Johnson, Jr. |
| 2006/0191719 | A1 | 8/2006 | Roussy |
| 2008/0083565 | A1 | 4/2008 | Roussy |
| 2009/0065255 | A1 | 3/2009 | Roussy |

FOREIGN PATENT DOCUMENTS

| | | |
|---|---|---|
| GB | 2436582 | 10/2007 |
| WO | WO 93/16236 | 8/1993 |
| WO | WO 99/63282 A1 | 12/1999 |
| WO | WO 2005/003648 | 1/2005 |
| WO | WO 2005/003648 A1 | 1/2005 |
| WO | WO 2006089400 A1 | 8/2006 |

OTHER PUBLICATIONS

"Energy Piles", Skanska.co.uk, http://www.skanska.co.uk/skanska/templates/pages.asp?id=9755.

"Skanska Technical Data Sheet" Skanska.co.uk, May 4, 2006, http://www.skanska.co.uk/index.asp?id=2849.

Koene, Frans, et al. "Energy piles as an efficient way to store heat", Caddet Energy Efficiency, 2000, p. 4-6.

Sanner, Burkhard, "Shallow Geothermal Energy", Geo-Heat Center Bulletin, Jun. 2001, p. 19-25, U.S.A.

"Ground Storage of Energy in Buildings" Arup.com. http://arup.com/geotechnic/feature.cfm?pageid=662>.

"Energy Piles". Skanska.co.uk. <http://www.skansa.co.uk/skansa/templates/page.asp?id=9755>.

"Skanska Technical Data Sheet". Skanska.co.uk. May 4 2006. <http://www.skansa.co.uk/index.asp?id=2849>.

Koene, Frans and Geelen Charles. "Energy piles as an efficient way to store heat". Caddet Energy Efficiency. 2000. <http://www.caddet.org/public/uploads/pdfs/newsletter/00s.

Sanner, Burkhard. "Shallow Geothermal Energy." Geo-Heat Center Bulletin. Jun. 2001. <http://geoheat.oit.edu/bulletin/bull22-2/art4.pdf>.

U.S. Appl. No. 12/327,973, Raymond Roussy.

U.S. Appl. No. 12/035,776, Raymond Roussy.

Tom A. Armour, P.E. "Micropiles for Earth Retention and Slope Stabilization." ADSC:The International Association of Foundation Drilling.

Curt Fitzgerald and Dwayne Lewis. Installation of Drilled Cased Micropiles using Low Mobility Grout. Presentation at the Great Lakes Geotechnical/Geoenvironmental.

Engineering Conference. May 7, 2004.

* cited by examiner

METHOD AND SYSTEM FOR INSTALLING GEOTHERMAL TRANSFER APPARATUSES WITH A SONIC DRILL

CROSS-REFERENCE TO RELATED APPLICATION AND CLAIM TO PRIORITY

This application is a continuation-in-part of application Ser. No. 11/067,225, filed Feb. 28, 2005, the disclosure of which is incorporated herein by reference and to which priority is claimed.

BACKGROUND OF THE INVENTION

This invention relates to geothermal heat exchange systems and underground thermal energy storage systems and, in particular, to a method of installing geothermal transfer apparatuses with a sonic drill.

Geothermal heat exchange systems and underground thermal energy storage systems are environmentally friendly, energy efficient, heating and cooling systems. Accordingly, there is a rising demand for such systems for both commercial and residential properties. There is therefore a need for a quick and efficient method of installing the geothermal transfer apparatuses used in many geothermal heat exchange systems and underground thermal energy storage systems.

SUMMARY OF THE INVENTION

There is provided a method for drilling a hole and installing a geothermal transfer apparatus. A sonic drilling apparatus is positioned at a desired location. The sonic drilling apparatus includes a rotating and vibrating apparatus for rotating and vibrating a hollow drill string into the ground, the hollow drill string having an inner space. The hole is drilled to a desired depth by rotating and vibrating the hollow drill string into the ground while discharging fluid into the inner space of the hollow drill string. A geothermal transfer apparatus is lowered into the inner space of the hollow drill string following the drilling of the hole to the desired depth. The drill string is then removed from the ground.

The method allows for cased holes to be drilled quickly and in litholgies that are often difficult for conventional drill rigs to drill in. The method also allows for more accurate control and monitoring the grouting process.

DESCRIPTION OF THE PREFERRED EMBODIMENT(S)

Figure 1:
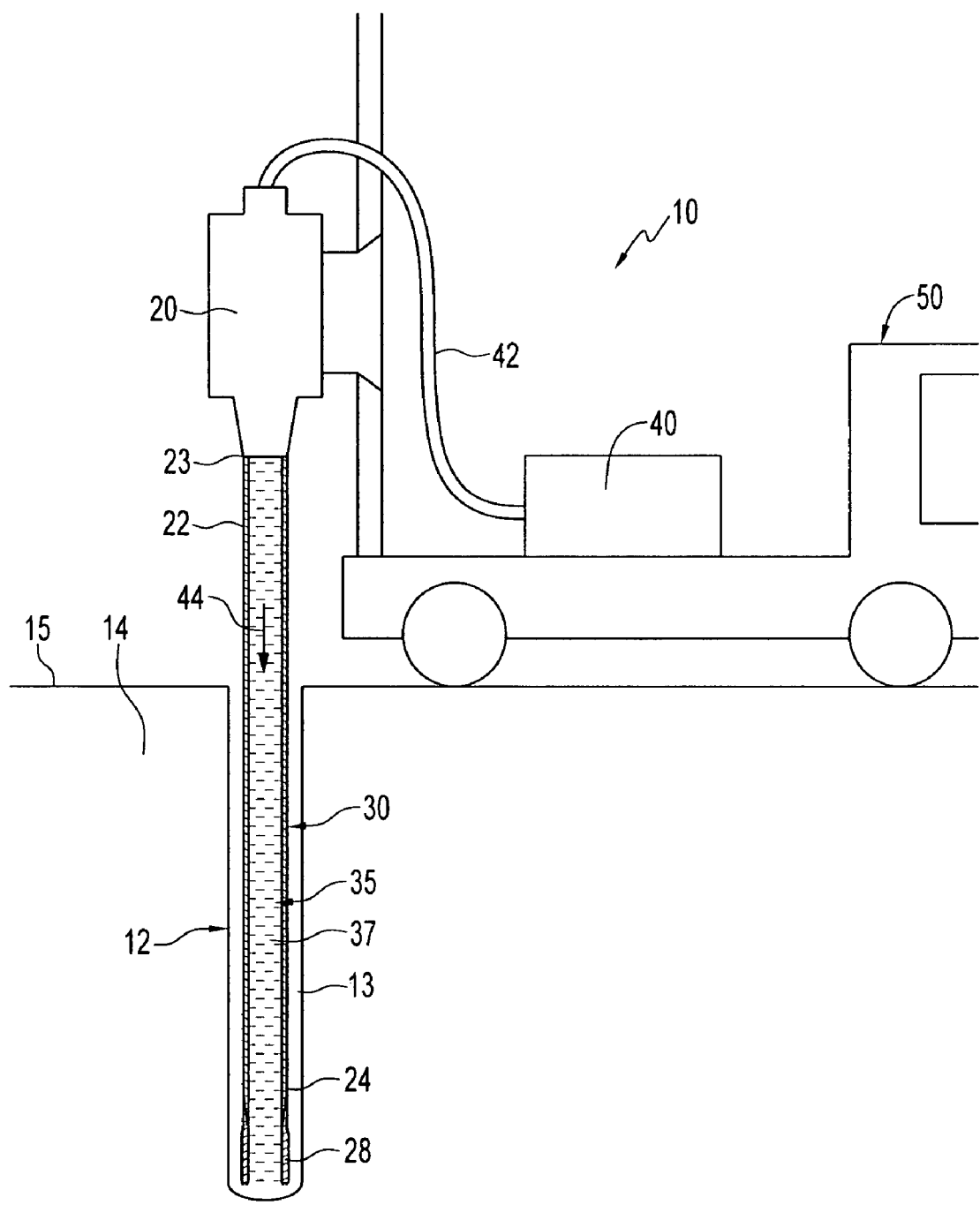
FIG. 1 is an elevational, partially in section, view of a drilling rig drilling a hole.

Referring to the drawings, and first to FIG. 1, this shows a drilling rig 10 drilling a hole 12 into the ground 14. The drilling rig 10 generally comprises a drilling apparatus 20 mounted on a movable vehicle 50. The vehicle 50 is at a desired drilling location on the ground surface 15 and the drilling apparatus 20 is in a desired drilling position. A drill pipe 22 is operatively connected to the drilling apparatus 20. The drill pipe 22 is hollow and open at both ends. A proximal end 23 of the drill pipe 22 is threadedly connected to the drilling apparatus 20, and a distal end 24 of the drill pipe 22 is threadedly connected to a drill bit 28. In this example, the drill bit 28 is a ring bit which is concentric with the drill pipe 22. The combination of the drill pipe 22 and the drill bit 28 form an open ended drill string 30. There is a cavity or inner space 35 defined by the drill string 30.

In this example, the drilling apparatus 20 is a rotary and vibratory apparatus in the form of a sonic drill. Sonic drills are well known in the art and examples of sonic drills are described in my earlier U.S. Pat. Nos. 5,027,908 and 5,409,070, the complete disclosures of which are incorporated herein by reference. Accordingly, the drilling apparatus 20 is not described in more detail herein. The drilling apparatus 20 rotates and vibrates the drill string 30 into the ground 14. A hose 42 hydraulically connects a pump apparatus 40 to the drilling apparatus 20. During the drilling process pressurized fluid is pumped by the pressurized fluid pump apparatus 40 along the hose 42, through the drilling apparatus 20, and into the inner space 35 of the drill string 30 as indicated by arrow 44. In this example, the pressurized fluid is water but water with added components such as polymer or clay may also be used. The pressurized fluid has a pressure range of between 100-5000 psi, with the preferred pressure range being between 500-2000 psi. This pressure facilitates faster drilling in ground conditions that would otherwise block the flow of pressurized fluid from the drill bit 28.

A fluid column 37 fills the inner space 35 of the drill string 30 and acts as a plug to impede the entry of ground materials into the inner space 35 of the drill string 30. The diameter of the hose 42 is less than the diameter of the inner space 35 of the drill string 30. This prevents the pressurized fluid from being pushed back through the hose in response to high pressure spikes created when the pressurized fluid impacts the ground 14 at the bottom of the hole 12. The vibrating drill string 30 causes the fluid column 37 to oscillate at the same frequency as the drill string 30. The pressure spikes thus created cause the fluid column 37 to act in a manner similar to a water hammer, thereby adding an additional drilling force.

Figure 2:
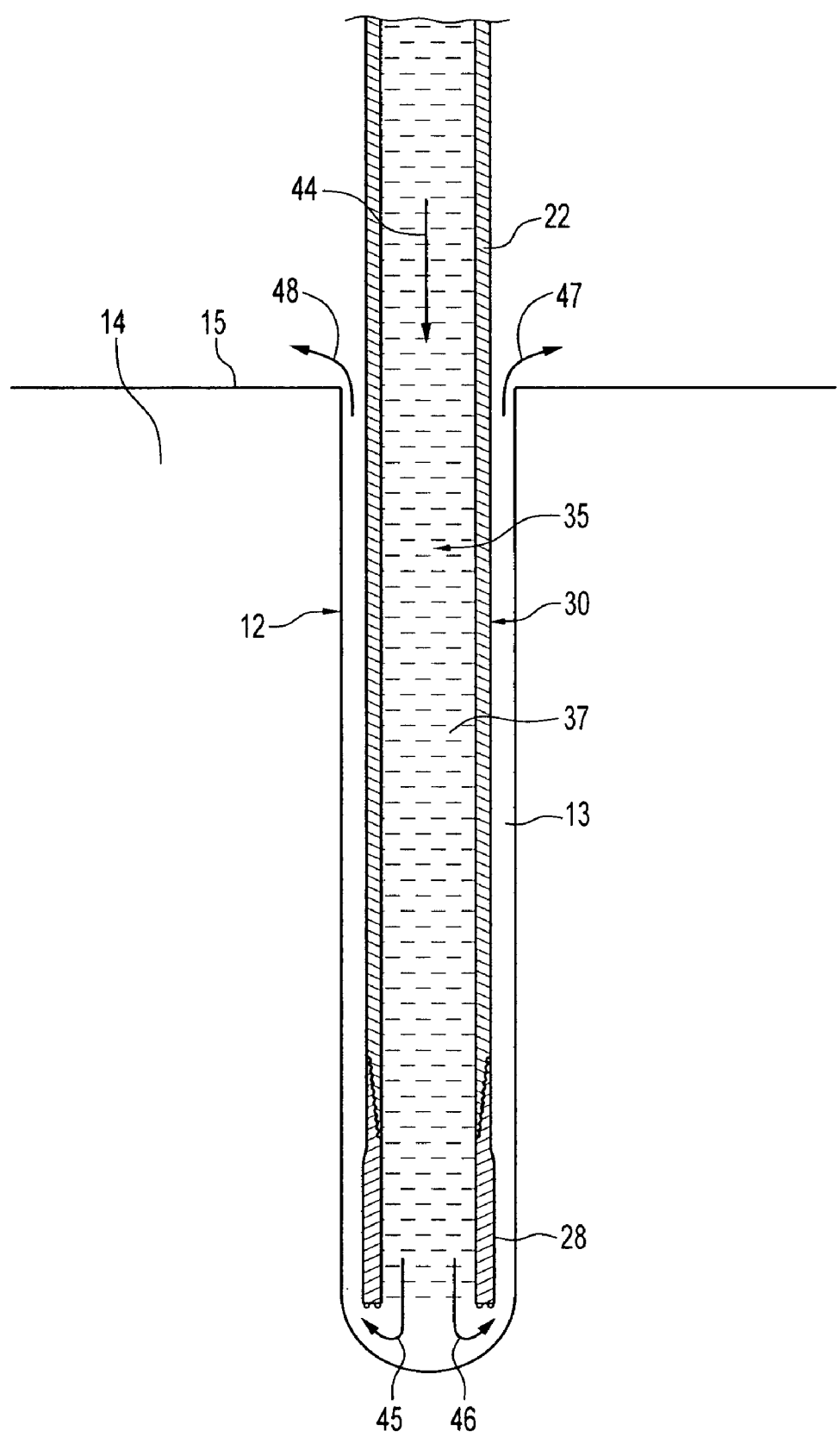
FIG. 2 is an elevational, cross-sectional, view illustrating pressurized fluid being discharged into the hole of FIG. 1.

At minimum, sufficient pressurized fluid is pumped into the inner space 35 of the drill string 30 to form the fluid column 37 which impedes the entry of ground debris into the inner space 35 by pushing the debris into the ground. However, as shown in FIG. 2, additional pressurized fluid may be pumped into the inner space 35 in order to carry ground debris and cuttings up an annulus 13, between the drill string 30 and the hole 12, to the ground surface 15. Arrow 44 indicates the direction of the flow of pressurized fluid into the ground 14 through the inner space 35 of the drill string 30. The excess pressurized fluid is pushed down and around the drill bit 28 and up the annulus 13 towards the ground surface 15 as indicated by arrows 45 and 46. The pressurized fluid carries ground debris and cuttings as it moves up the annulus 13 to the ground surface 15 where the pressurized fluid and cuttings are expelled from the hole 12 as indicated by arrows 47 and 48.

Figure 3:
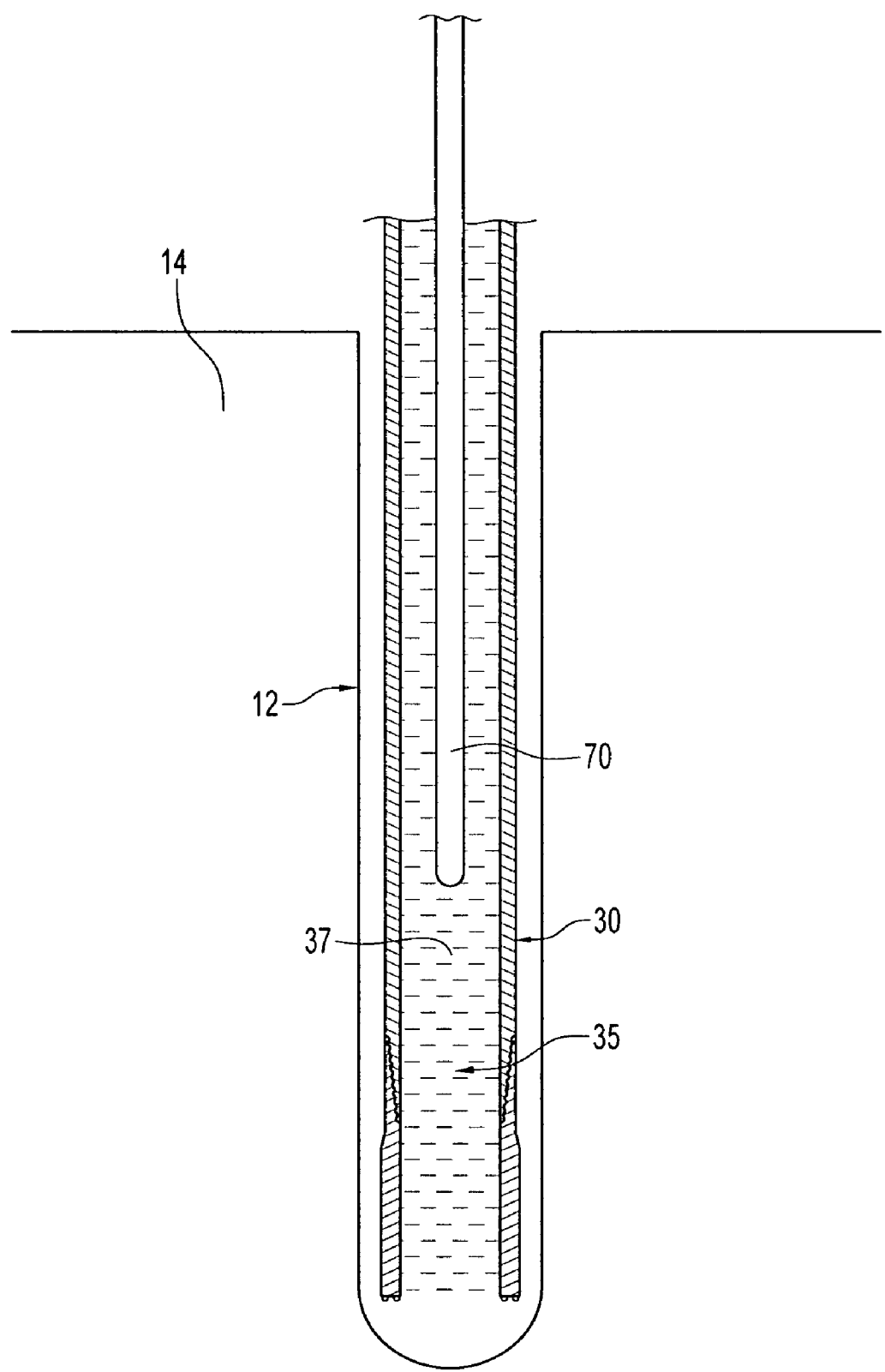
FIG. 3 is an elevational, cross-sectional, view illustrating a geothermal transfer apparatus being lowered into hole of FIG. 1.

Additional drill pipes (not shown) may be added in sequence to the drill string 30. Each additional drill pipe has a first end and a second end. The additional drill pipes are hollow and open at both ends. First ends of the additional drill pipes are threadedly connected to the drilling apparatus 20 and second ends of the additional drill pipes are threadedly connected to the drill string 30. The additional drill pipes may then be rotated and vibrated into the ground to increase the depth of the hole 12. The additional drill pipes may be added manually or with an automated drill pipe handling apparatus. As shown in FIG. 3, once the hole 12 has been drilled to a desired depth, the drill string 30 is disconnected from the drilling apparatus 20 leaving the hole 12 which is cased by the drill string 30. A geothermal transfer apparatus 70, which is capable of transferring heat to and from the ground 14, is then lowered into the cased hole 12 through the inner space 35 of the drill string 30.

Figure 4:
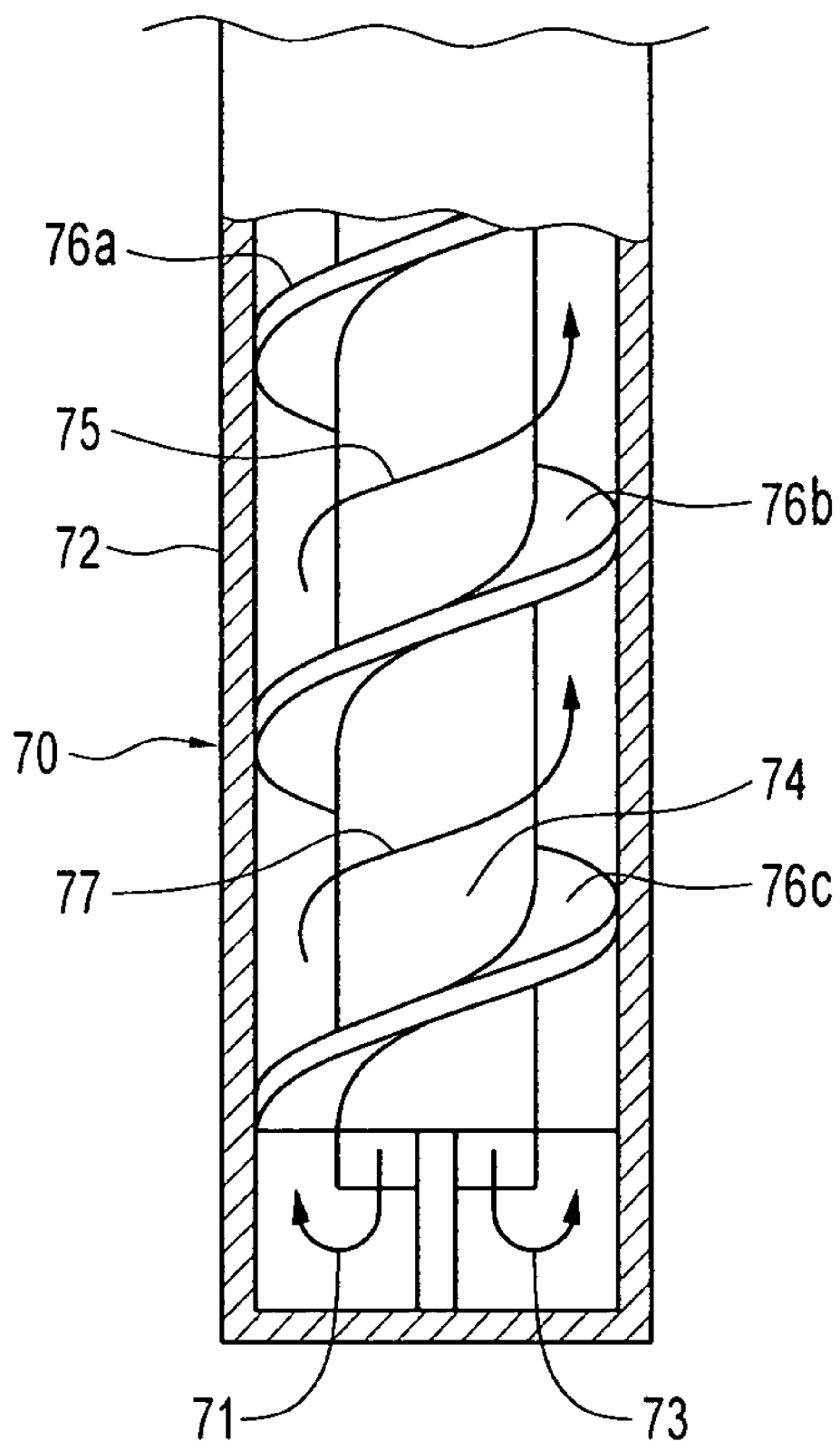
FIG. 4, is a fragmentary, partially in section, view of the geothermal transfer apparatus of FIG. 3.

In this example, the geothermal transfer apparatus 70 is a coaxial-flow geothermal transfer apparatus which is best shown in FIG. 4. The geothermal transfer apparatus 70 is similar to the type disclosed in co-pending U.S. patent application Ser. No. 11/076,428 to Kidwell et al., the complete disclosure of which is incorporated herein by reference. As shown in FIG. 4, the co-axial geothermal transfer apparatus 70 comprises an outer, thermally-conductive, conduit 72 and an inner conduit 74 disposed within the outer conduit 72. The inner conduit 74 has a plurality of connected fins 76a, 76b and 76c which form a spiral annular flow channel between the inner conduit 74 and the outer conduit 72. In operation, fluid is pumped from the ground surface down the inner conduit 74 where it exits at a distal end of the inner conduit 74 as indicated by arrows 71 and 73. The fluid then flows along the annular flow channel back up to the ground surface as indicated by arrows 75 and 77. The circulating fluid allows for heat transfer between the ground and an ambient environment.

It is known to use coaxial-flow geothermal transfer apparatuses in geothermal heat exchange systems as is disclosed in co-pending U.S. patent application Ser. No. 11/372,224 and continuations thereof to Kidwell et al., the complete disclosures of which are incorporated herein by reference, and in which a coaxial-flow geothermal transfer apparatus is coupled to a heat exchanger. Accordingly, the present method provides an improved means of installing coaxial-flow geothermal transfer apparatuses used in geothermal heat exchange systems.

In other examples, the geothermal transfer apparatus may be a superconducting heat transfer device similar to the type disclosed in U.S. Pat. Nos. 6,132,823 and 6,911,231 to Qu, the complete disclosures of which are incorporated herein by reference. Superconducting heat transfer devices allow for bi-directional heat transfer to and from the ground. The superconducting heat transfer device disclosed by Qu generally includes a substrate, in the form of a conduit, which carries a superconducting heat transfer medium. The superconducting heat medium is applied to an inner surface of the conduit in three basic layers, the first two being prepared from solution and the third being a powder.

The first layer of the superconducting heat medium comprises at least one compound selected from the group consisting of sodium peroxide, sodium oxide, beryllium oxide, manganese sesquioxide, aluminum dichromate, calcium dichromate, boron oxide, and a dichromate radical. The first layer of the superconducting heat medium is absorbed into the inner surface of the conduit and is an anti-corrosion layer which prevents etching on the inner surface of the conduit. In theory the first layer also causes re-alignment of the atomic apparatus of the material comprising the conduit so that heat may be more readily absorbed. A further function of the first layer is to prevent the inner surface of the conduit from producing oxides as oxidation of the inner surface of the conduit will cause heat resistance.

The second layer of the superconducting heat medium comprises at least one compound selected from the group consisting of cobaltous oxide, manganese sesquioxide, beryllium oxide, strontium chromate, strontium carbonate, rhodium oxide, cupric oxide, $\beta$-titanium, potassium dichromate, boron oxide, calcium dichromate, manganese dichromate, aluminum dichromate, and a dichromate radical. The second layer of the superconducting heat medium prevents the production of elemental hydrogen and oxygen thus restraining oxidation between the oxygen atoms and the atoms of the material comprising the conduit. In theory the second layer conducts heat across the inner conduit surface. A further function of the second layer is to assist in accelerating molecular oscillation and friction associated with the third layer of the superconducting heat medium so as to provide a heat pathway for conduction.

The third layer of the superconducting heat medium comprises at least one compound selected from the group consisting of denatured rhodium oxide, potassium dichromate, denatured radium oxide, sodium dichromate, silver dichromate, monocrystalline silicon, beryllium oxide, strontium chromate, boron oxide, sodium peroxide, $\beta$-titanium, and a metal dichromate. The third layer of the superconducting heat medium is believed to generate heat once the superconducting heat medium is exposed to a minimum activation temperature. Upon activation atoms in the third layer of the superconducting heat medium begin to oscillate in concert with atoms in the first and second layers of the superconducting heat medium. Experimentation has shown when such a superconducting heat medium is properly disposed on a substrate it has a thermal conductivity that is generally 20,000 times higher than the thermal conductivity of silver.

It is known to use geothermal transfer apparatuses comprising a thermal superconducting medium in geothermal heat exchange systems as is disclosed in co-pending U.S. patent application Ser. No. 11/532,023 to Mueller et al., the complete disclosure of which is incorporated herein by reference, and in which a geothermal transfer apparatuses comprising a thermal superconducting medium is coupled to a heat exchanger. Accordingly, the method invention also provides an improved means of installing geothermal transfer apparatuses comprising a thermal superconducting medium and which are used in geothermal heat exchange systems.

Figure 5:
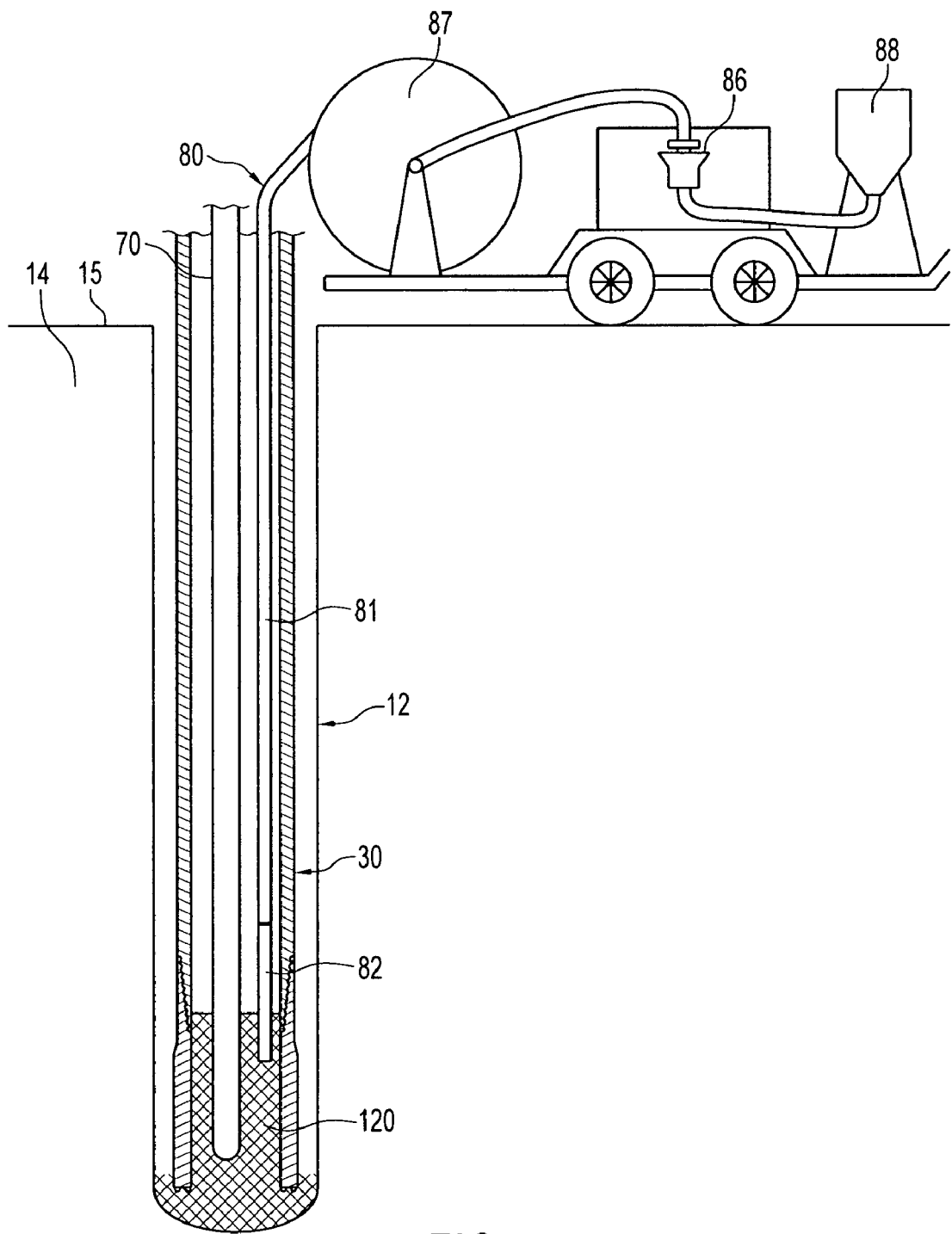
FIG. 5 is an elevational, partially in section, view of a grouting rig grouting the hole of FIG. 1 during installation of a geothermal heat exchange system or underground thermal energy storage system.

Referring now to FIG. 5, once the geothermal transfer apparatus 70 has been completely lowered into the hole 12, the hole 12 may be grouted. The hole 12 may be grouted with the drill string 30 remaining in the ground 14 or after the drill string 30 has been removed from the ground 14. In this example, grouting is accomplished by the tremie line method. A tremie line hose 80 is lowered into the hole 12. The tremie line hose is comprised of a steel pipe section 82 at a first end and a flexible tube section 81 at a second end thereof. The steel pipe section 82 is the lead end of the tremie hose line 80 lowered into the hole 12. A pump 86 pumps thermally conductive grouting material 120 from a reservoir 88 along the tremie hose line 80 to the bottom of the hole 12. The grouting material 120 encompasses the geothermal transfer apparatus 70. As the hole 12 is filled from the bottom up, a tremie line hose reel 87 pulls the tremie line hose 80 out of the hole 12, so as to maintain the lead end of the of the tremie line hose 80 below the grouting material 120. This process is continued until the hole 12 has been filled with grouting material 120 and the grouting material encompasses the portion of the geothermal transfer loop 70 which is below the ground surface 15.

In other examples, grouting may be accomplished by the pressure grouting method. Pressure grouting may be accomplished by attaching a grout line to the top of the of the drill string 30 or a grout line can be attached to the swivel on the drill head. As the drill string 30 is removed from the ground, grouting material is simultaneously pumped into the inner space 35 of the drill string 30. The grouting is topped up once the casing has been removed. In some cases grouting may not be required, for example in silty or sandy soils which collapse about the geothermal loop when the drill string is removed.

Figure 6:
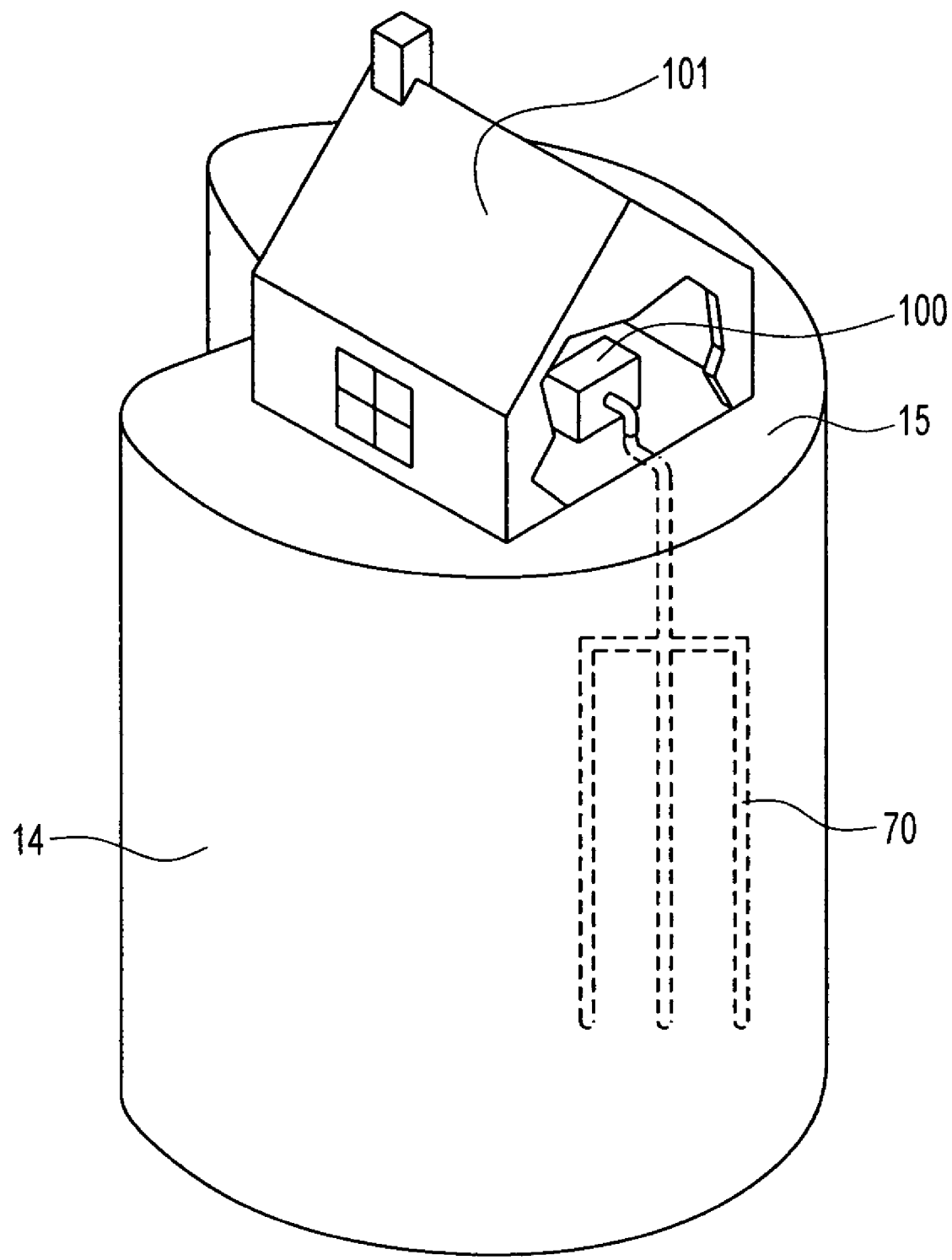
FIG. 6 is a perspective view of a geothermal heat exchange system.

As shown in FIG. 6, once the grouting process is completed, either by the tremie line method or the pressure grouting method, the geothermal transfer apparatus 70 may be operatively connected to the heat exchanger 100 disposed within in building 101, or other structure housing an ambient environment, to form a geothermal heat exchange system. The geothermal transfer apparatus 70 may also be operatively connected below the ground surface 15, in series, to additional geothermal transfer apparatuses below the ground surface. The series of geothermal transfer apparatuses are then connected to a communal heat exchanger.

Figure 7:
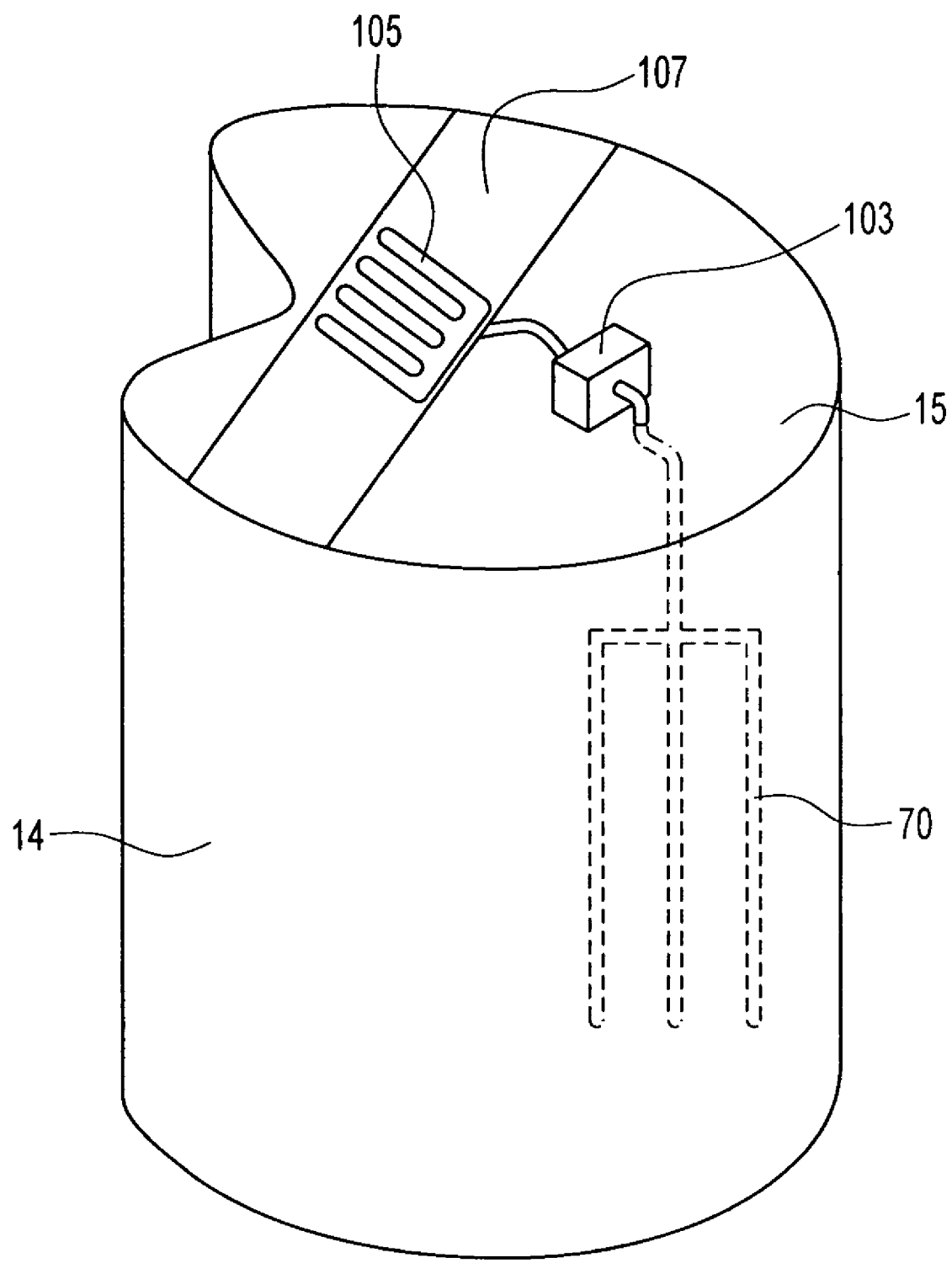
FIG. 7 is a perspective view of an underground thermal energy storage system.

Alternatively, as shown in FIG. 7, the geothermal transfer apparatus 70 may be operatively connected to a heat pump 103, which is turn is coupled to a thermal energy collector 105, to form an underground thermal energy storage system. In the example shown in FIG. 7, the geothermal energy collector 105 is a solar energy collector disposed in a roadway 107. Heat from solar radiation on the surface of the roadway 107 is collected by the thermal energy collector 105 during the summer. The heat is then pumped, by the heat pump 103, into the ground 14 where it is stored. The stored heat may later be used to melt snow or ice on the surface of the roadway 107 during the winter. In another example, heat from the ground may be used to heat cold air during the winter. This causes a lowering of the ground temperature. The lowered ground temperature may later be used to cool an ambient environment during the summer. Accordingly, both heat and cold may be stored in underground thermal energy storage systems.

Figure 8:
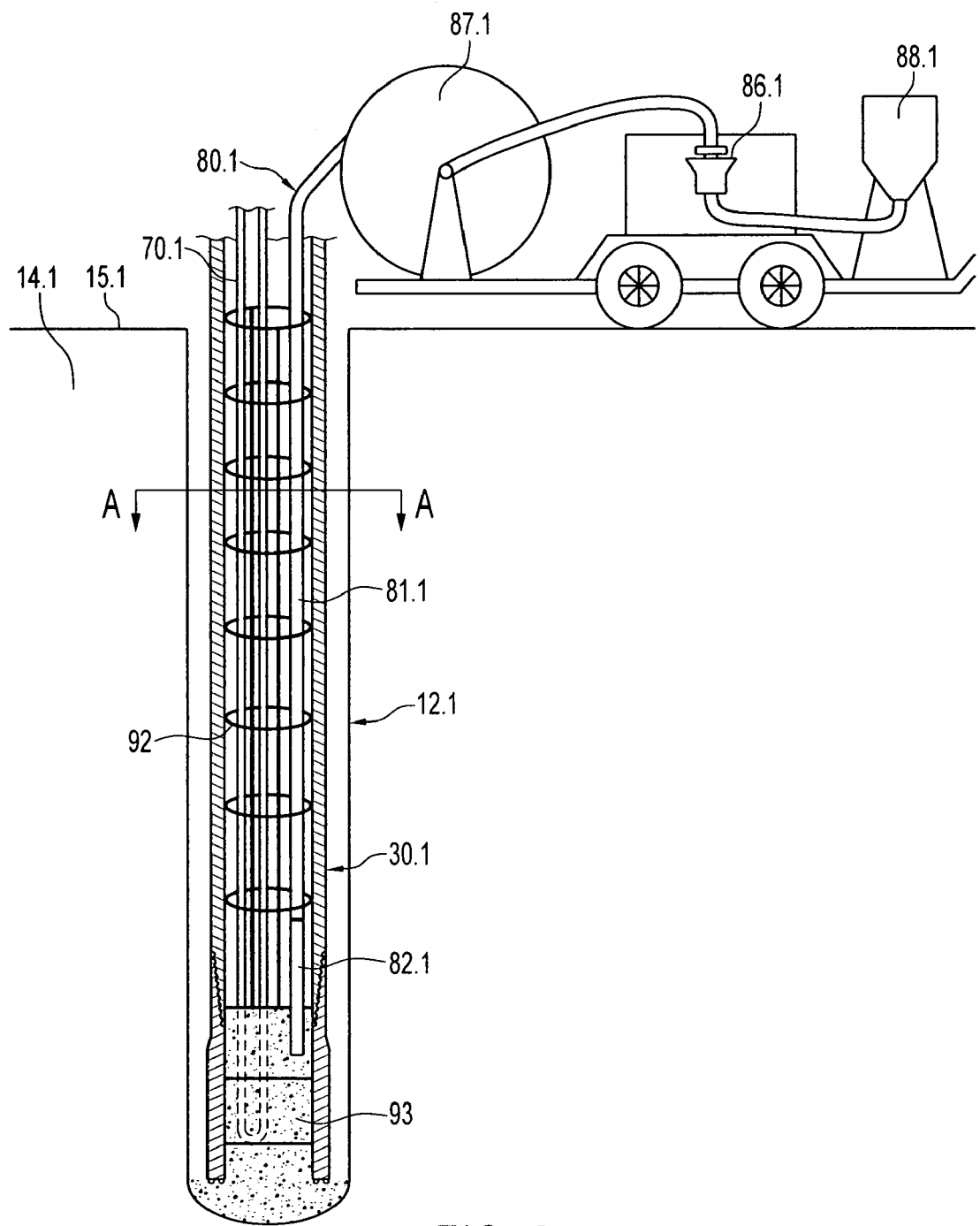
FIG. 8 is an elevational, partially in section, view of a grouting rig grouting the hole of FIG. 1 during the installation of an energy pile.
Figure 9:
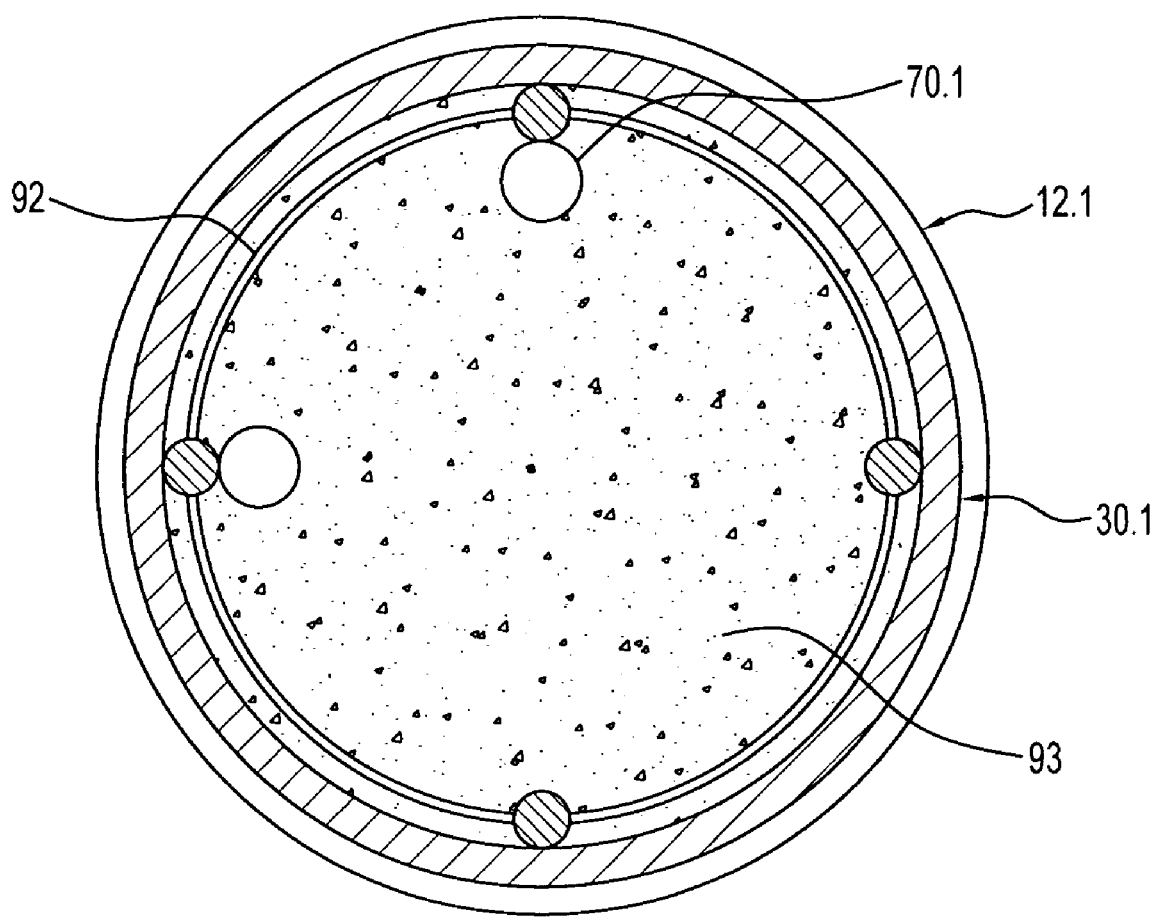
FIG. 9 is view taken along line A-A of FIG. 8.
Figure 10:
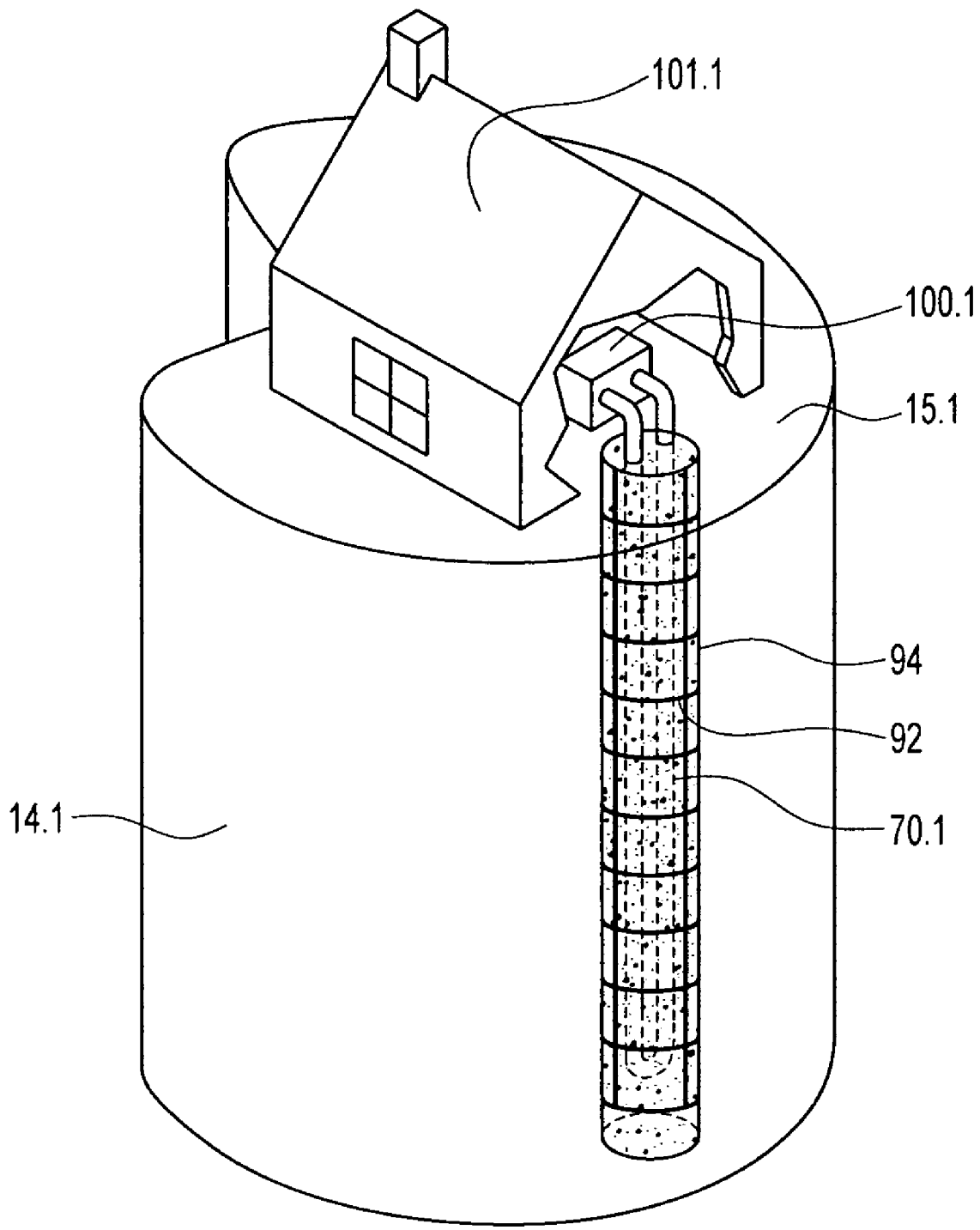
FIG. 10 is a perspective view of an energy pile.

Referring now to FIGS. 8 and 9, in another application, a geothermal transfer apparatus 70.1 fitted to a reinforced steel structure 92 is lowered into the cased hole 12.1 drilled according to the present method. In FIGS. 8 and 9 like structure and environment have been given like reference numerals as in FIG. 5 with the additional numerical designation "1.". In this example, the geothermal transfer apparatus 70.1 is a geothermal transfer loop. However, it will be understood by a person skilled in the art that any geothermal transfer apparatus capable of transferring heat to and from the ground may be used. Once the combination of the geothermal transfer apparatus 70.1 and reinforced steel structure 92 are lowered into the hole 12.1 the hole 12.1 may be grouted with concrete 93 using the tremie line method, previously described herein, to form an energy pile 94 which is shown in FIG. 10. In FIG. 10 like structure and environment have been given like reference numerals as in FIG. 6 with the additional numerical designation "0.1". The energy pile 94 provides foundational support to a building 101.1 and is also operatively connected to a heat exchanger 100.1 disposed within the building 101.1 to form a geothermal heat exchange system. Accordingly, energy piles are a cost-effective way of installing geothermal heat exchange systems in ground conditions where foundation piles are required. Presently such energy piles are being installed by Cementation Foundations Skanska of Maple Cross House, Denham Way, Maple Cross, Rickmansworth, Herts, United Kingdom, WD3 9SW.

Figure 11:
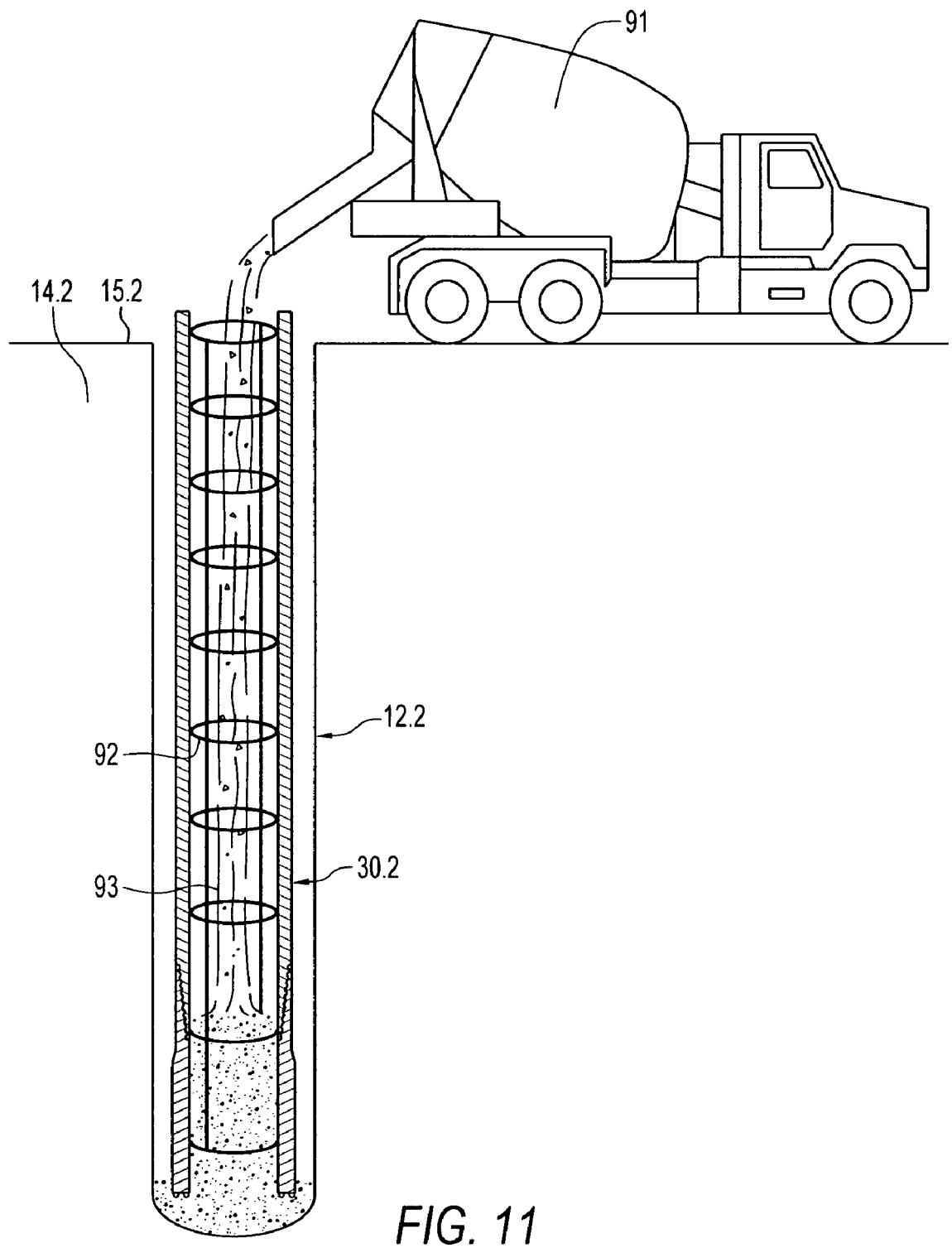
FIG. 11 is an elevational, partially in section, view of a cement truck discharging concrete into the hole of FIG. 1 during the installation of a cast-in-place concrete pile.
Figure 12:
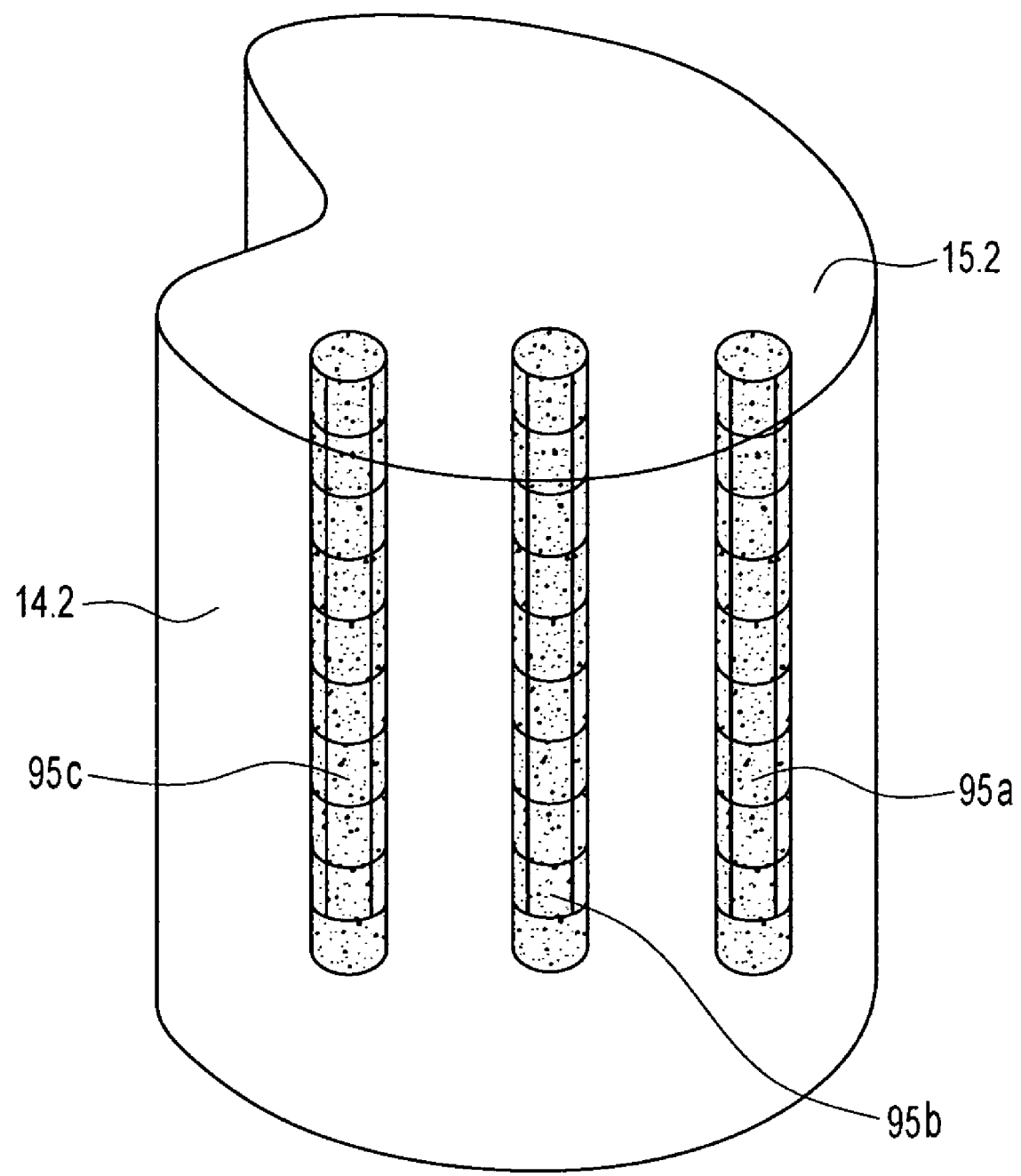
FIG. 12 is a perspective view of a cast-in-place concrete pile.

Referring now to FIGS. 11 and 12, in yet another application, the cased hole 12.2 drilled according to the present method may be filled with concrete for the installation of cast-in-place concrete piles. In FIGS. 11 and 12 like structure and environment have been given like reference numerals as in FIGS. 5 and 6, respectively, with the additional numerical designation "0.2". There are many advantages to using cast-in-place concrete piles over traditional timber piles. For example, cast-in-place concrete piles are free from decay or attack by insect or marine borers. The load capacity of concrete is also greater than that of wood. As shown in FIG. 11, once the cased hole 12.2 is drilled to a desired depth, according the above-described method, a cement mixer 91 discharges concrete 93 into the hole 12.2. When the hole 12.2 is full of concrete the drill string 30.2 is vibrated out of the hole. As the drill string 30 is vibrated out of the hole the concrete 93 is forced to flow into a void created by the drill string 30 and intermingles with the surrounding soil particles creating a very strong bond after the concrete 93 has cured. The resulting cast-in-place concrete piles 95a, 95b and 95c are shown in FIG. 12 and may be used to provide foundational support for a building.

It will be understood by someone skilled in the art that many of the details provided above are by way of example only and can be varied or deleted without departing from the scope of the invention as set out in the following claims.

I claim:

1. A method of drilling a hole into the ground and installing a geothermal transfer apparatus, the method comprising the steps of:
    positioning a sonic drilling apparatus at a desired location, the sonic drilling apparatus including a rotating and vibrating apparatus for rotating and vibrating a hollow drill string into the around, the hollow drill string having an inner space;
    drilling the hole to a desired depth by rotating and vibrating the hollow drill string into the ground and discharging a fluid into the inner space of the hollow drill string;
    fitting the geothermal transfer apparatus to a reinforced steel structure and lowering both the geothermal transfer apparatus and the reinforced steel structure into the inner space of the hollow drill string following the drilling of the hole to the desired depth; and
    removing the hollow drill string from the ground,
    wherein said geothermal transfer apparatus is one of a coaxial flow geothermal transfer apparatus, a geothermal transfer loop, or a geothermal transfer apparatus comprising a thermal superconducting medium.

2. The method claimed in claim 1, further including discharging grouting material into the hole following the lowering of the geothermal transfer apparatus and the reinforced steel structure into the inner space of the hollow drill string.

3. The method as claim in claim 2 further including using concrete as the grouting material.

4. The method claimed in claim 1, further including discharging grouting material into the hole following the lowering of the geothermal transfer apparatus into the inner space of the hollow drill string.

5. The method claimed in claim 1, further including vibrating the hollow drill string out of the ground while simultaneously discharging grouting material into the inner space of the hollow drill string following the lowering of the geothermal transfer apparatus loop into the inner space of the hollow drill string.

6. The method claimed in claim 1, further including operatively connecting the geothermal transfer apparatus to a heat exchanger.

7. The method claimed in claim 1, further including discharging sufficient fluid into the inner space of the hollow drill string to keep the inner space clear of debris.

8. The method claimed in claim 7, wherein the fluid oscillates at the same frequency as the drill string.

9. The method claimed in claim 1, further including discharging sufficient fluid into the inner space of the hollow drill string to either carry debris up an outside of the hollow drill string to the ground surface or push debris into the ground.

10. The method claimed in claim 1, further including connecting the geothermal transfer apparatus to a heat pump which is coupled to a thermal energy collector.

11. A system for drilling a hole and installing a geothermal transfer apparatus, the system comprising:
    a sonic drilling apparatus including a rotating and vibrating apparatus for rotating and vibrating a hollow drill string into the ground, the hollow drill string having an inner space, and the hollow drill string including a drill pipe and a ring bit;
    a fluid discharging apparatus for discharging a fluid into the inner space of the hollow drill string;
    a geothermal transfer apparatus for lowering into the inner space of the hollow drill string; and
    a grouting apparatus for discharging grouting material to encompass the geothermal transfer apparatus, further including fitting the geothermal transfer apparatus to a reinforced steel structure and lowering both the geothermal apparatus and the reinforced steel structure into the inner space of the hollow drill string following drilling of the hole
    wherein the geothermal transfer apparatus is one of a coaxial flow geothermal transfer apparatus, a geothermal transfer loop, or a geothermal transfer apparatus comprising a thermal superconducting medium.

12. The system claimed in claim 11, wherein the fluid discharging apparatus and the drilling apparatus operate simultaneously.

13. The system claimed in claim 11, wherein the fluid oscillates at the same frequency as the drill string.

14. The system as claimed in claim 11, wherein a hose connects the fluid discharging apparatus to the drilling apparatus.

15. The system as claimed in claim 11, where the hose has a cross sectional area and the inner space of the hollow drill string has a cross sectional area, the cross sectional area of the hose being less than the cross sectional area of the inner space of the hollow drill string.

16. The system claimed in claim 11, wherein the grouting apparatus and the drilling apparatus operate simultaneously.

17. The system as claimed in claim 11 wherein the drill pipe has a first end and a second end, the drill pipe being hollow and the drill pipe being open at the first end and open at the second end.

18. The system claimed in claim 11, further including connecting the geothermal transfer apparatus to a heat pump which is coupled to a thermal energy collector.

* * * * *